US 9,335,216 B2

(12) United States Patent  (10) Patent No.: US 9,335,216 B2
Wang et al.  (45) Date of Patent: May 10, 2016

(54) SYSTEM AND METHOD FOR ON-LINE OPTICAL MONITORING AND CONTROL OF A GAS TURBINE ENGINE

(71) Applicant: General Electric Company, Schenectady, NY (US)

(72) Inventors: Guanghua Wang, Clifton Park, NY (US); Wontae Hwang, Clifton Park, NY (US); Jeremy Vanderover, Latham, NY (US)

(73) Assignee: General Electric Company, Niskayuna, NY (US)

( * ) Notice: Subject to any disclaimer, the term of this patent is extended or adjusted under 35 U.S.C. 154(b) by 514 days.

(21) Appl. No.: 13/925,635

(22) Filed: Jun. 24, 2013

(65) Prior Publication Data

US 2014/0376588 A1  Dec. 25, 2014

(51) Int. Cl.
*G01J 5/60* (2006.01)
*G01J 5/08* (2006.01)
*G01J 5/00* (2006.01)

(52) U.S. Cl.
CPC ............ *G01J 5/0088* (2013.01); *G01J 5/602* (2013.01); *G01J 2005/0077* (2013.01)

(58) Field of Classification Search
CPC . G01J 2005/0077; G01J 5/0088; G01J 5/602; G01M 15/14
See application file for complete search history.

(56) References Cited

U.S. PATENT DOCUMENTS

| | | | |
|---|---|---|---|
| 5,578,828 A | 11/1996 | Brown et al. | |
| 6,517,236 B2 | 2/2003 | Sun et al. | |
| 7,549,789 B2 | 6/2009 | Tralshawala et al. | |
| 7,710,280 B2 | 5/2010 | McLellan | |
| 7,746,236 B2 | 6/2010 | Cole | |
| 8,070,482 B2 | 12/2011 | Fuentes et al. | |
| 8,432,440 B2 | 4/2013 | Krull et al. | |
| 2006/0088793 A1 | 4/2006 | Brummel et al. | |
| 2010/0103424 A1* | 4/2010 | Davis, Jr. ............... | F23N 5/082 356/402 |
| 2011/0240858 A1 | 10/2011 | Estevadeordal et al. | |
| 2011/0267428 A1 | 11/2011 | George et al. | |
| 2012/0002035 A1 | 1/2012 | Li et al. | |
| 2012/0153157 A1 | 6/2012 | Estevadeordal et al. | |
| 2012/0235042 A1 | 9/2012 | Cole et al. | |
| 2013/0009062 A1 | 1/2013 | Cole | |

* cited by examiner

*Primary Examiner* — Mark R Gaworecki
(74) *Attorney, Agent, or Firm* — Ann M. Agosti

(57) ABSTRACT

A system for on-line optical monitoring of a gas turbine engine includes a viewport into a combustor of the gas turbine engine and an optical filter optically coupled to the viewport. The optical filter is configured to receive broad wavelength band thermal radiation from an interior surface of the combustor while the gas turbine engine is in operation, to substantially block wavelengths of the broad wavelength band thermal radiation emitted and/or absorbed by a flame and/or by exhaust gas within the combustor, and to output narrow wavelength band thermal radiation from the interior surface of the combustor. The system also includes a detector array in optical communication with the optical filter. The detector array is configured to receive the narrow wavelength band thermal radiation and to output signals indicative of a two-dimensional intensity map of the narrow wavelength band thermal radiation.

20 Claims, 4 Drawing Sheets ered to receive broad wavelength band thermal radiation from an interior surface of the combustor while the gas turbine engine is in operation, to substantially block wavelengths of the broad wavelength band thermal radiation emitted and/or absorbed by a flame and/or by exhaust gas within the combustor, and to output narrow wavelength band thermal radiation from the interior surface of the combustor. The system also includes a detector array in optical communication with

SYSTEM AND METHOD FOR ON-LINE OPTICAL MONITORING AND CONTROL OF A GAS TURBINE ENGINE

BACKGROUND

The subject matter disclosed herein relates to a system and method for on-line optical monitoring and control of a gas turbine engine.

Certain gas turbine engines include a combustor having viewports configured to facilitate monitoring of various interior surfaces of the combustor. For example, a pyrometry system may be in optical communication with the viewports and configured to measure the temperature of certain surfaces within the combustor. As will be appreciated, certain combustion products species, such as water vapor and carbon dioxide, absorb and/or emit radiation over a wide range of wavelengths. As a result, only a fraction of wavelengths emitted by the interior surfaces reach the viewports with sufficient intensity and negligible interference for accurate measurement. Consequently, certain pyrometry systems include sensors particularly configured to monitor wavelengths which are more likely to pass through the combustion products without significant absorption or interference. However, such sensors typically provide either a line-of-sight point temperature measurement or an average temperature measurement of each monitored surface.

Moreover, employing a two-dimensional detector array (e.g., a mid-wave infrared detector) to monitor surfaces within the combustor may not be effective due to interference from the combustion products. For example, the combustion products may absorb and/or emit radiation within a detectable wavelength range of the detector array. Accordingly, wavelengths emitted by the interior surfaces may not reach the viewports with sufficient intensity and negligible interference to be detected by the two-dimensional detector array.

BRIEF DESCRIPTION

In one embodiment, a system for on-line optical monitoring of a gas turbine engine includes a viewport into a combustor of the gas turbine engine and an optical filter optically coupled to the viewport. The optical filter is configured to receive broad wavelength band thermal radiation from an interior surface of the combustor while the gas turbine engine is in operation, to substantially block wavelengths of the broad wavelength band thermal radiation emitted and/or absorbed by a flame and/or by exhaust gas within the combustor, and to output narrow wavelength band thermal radiation from the interior surface of the combustor. The system also includes a detector array in optical communication with the optical filter. The detector array is configured to receive the narrow wavelength band thermal radiation and to output signals indicative of a two-dimensional intensity map of the narrow wavelength band thermal radiation.

In another embodiment, a system for on-line optical monitoring and control of a gas turbine engine includes a viewport into a combustor of the gas turbine engine and an optical filter optically coupled to the viewport. The optical filter is configured to receive broad wavelength band thermal radiation from an interior surface of the combustor while the gas turbine engine is in operation, to substantially block wavelengths of the broad wavelength band thermal radiation emitted and/or absorbed by a flame and/or by exhaust gas within the combustor, and to output narrow wavelength band thermal radiation from the interior surface of the combustor. The system also includes a detector array in optical communication with the optical filter. The detector array is configured to receive the narrow wavelength band thermal radiation and to output signals indicative of a two-dimensional intensity map of the narrow wavelength band thermal radiation. In addition, the system includes a controller communicatively coupled to the detector array. The controller is configured to control a parameter affecting combustion in the combustor based on the signals.

In a further embodiment, a method for on-line optical monitoring of a gas turbine engine includes receiving broad wavelength band thermal radiation from an interior surface of a combustor of the gas turbine engine while the gas turbine engine is in operation. The method also includes filtering the broad wavelength band thermal radiation with an optical filter to substantially block wavelengths of the broad wavelength band thermal radiation emitted and/or absorbed by a flame and/or by exhaust gas within the combustor, and to output narrow wavelength band thermal radiation from the interior surface of the combustor. In addition, the method includes outputting signals indicative of a two-dimensional intensity map of the narrow wavelength band thermal radiation via a detector array in optical communication with the optical filter.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
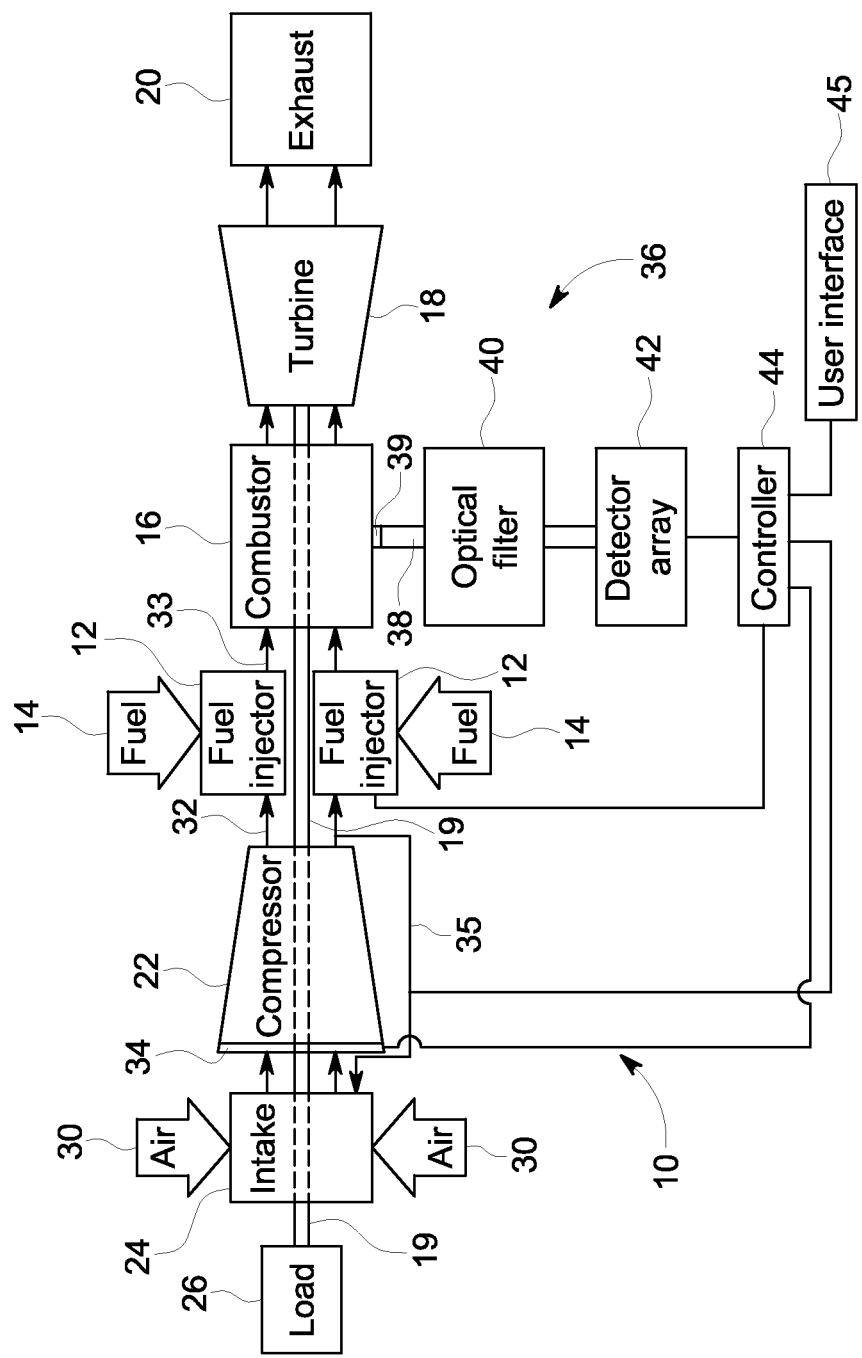
FIG. 1 is a block diagram of an embodiment of a gas turbine system, including an on-line optical monitoring system.

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments disclosed herein, the articles "a," "an," "the," and "said" are intended to mean that there are one or more of the elements. The terms "comprising," "including," and "having" are intended to be inclusive and mean that there may be additional elements other than the listed elements.

Embodiments disclosed herein may enhance gas turbine engine operation and maintenance by providing a two-dimensional temperature map of an interior surface of a combustor of the gas turbine engine. In certain embodiments, a system for on-line optical monitoring of a gas turbine engine includes a viewport into a combustor of the gas turbine engine. The optical monitoring system also includes an optical filter optically coupled to the viewport. The optical filter is configured to receive broad wavelength band thermal radiation from an interior surface of the combustor while the gas turbine engine is in operation. The optical filter is also configured to substantially block wavelengths of the broad wavelength band thermal radiation emitted and/or absorbed by a flame and/or by exhaust gas within the combustor, and to output narrow wavelength band thermal radiation from the interior surface of the combustor. The optical monitoring system also includes a detector array in optical communication with the optical filter. The detector array is configured to receive the narrow wavelength band thermal radiation and to output signals indicative of a two-dimensional intensity map of the narrow wavelength band thermal radiation. The optical filter enables the detector array to monitor an interior surface of the combustor on an opposite side of a flame and/or exhaust gas from the viewport. In certain embodiments, the optical monitoring system includes a controller configured to detect thermal barrier coating (TBC) detachment/spallation and/or blocked/worn cooling holes based on the signals from the detector array. In addition, the controller may be configured to generate a two-dimensional temperature map of the interior surface of the combustor based on the signals, thereby facilitating determination of additional information, such as thermal stress within the monitored surface. Furthermore, as discussed in detail below, the controller may be configured to control a parameter affecting combustion within the combustor based on the signals, thereby enhancing performance and/or increasing a maintenance interval of the gas turbine engine.

Turning now to the drawings, FIG. 1 is a block diagram of an embodiment of a turbine system 10, including an on-line optical monitoring system. The turbine system 10 includes a fuel nozzle/injector 12, a fuel supply 14, and a combustor 16. As illustrated, the fuel supply 14 routes a liquid fuel and/or gas fuel, such as natural gas, to the gas turbine system 10 through the fuel injector 12 into the combustor 16. As discussed below, the fuel injector 12 is configured to inject and mix the fuel with compressed air. The combustor 16 ignites and combusts the fuel-air mixture, and then passes hot pressurized exhaust gas into a turbine 18. As will be appreciated, the turbine 18 includes one or more stators having fixed vanes or blades, and one or more rotors having blades that rotate relative to the stators. The exhaust gas passes through the turbine rotor blades, thereby driving the turbine rotor to rotate. Coupling between the turbine rotor and a shaft 19 induces rotation of the shaft 19, which is also coupled to several components throughout the gas turbine system 10, as illustrated. Eventually, the exhaust of the combustion process exits the gas turbine system 10 via an exhaust outlet 20.

A compressor 22 includes blades rigidly mounted to a rotor, which is driven to rotate by the shaft 19. As air passes through the rotating blades, air pressure increases, thereby providing the combustor 16 with sufficient air for proper combustion. The compressor 22 intakes air to the gas turbine system 10 via an air intake 24. Further, the shaft 19 may be coupled to a load 26, which is powered via rotation of the shaft 19. As will be appreciated, the load 26 may be any suitable device that may use the power of the rotational output of the gas turbine system 10, such as a power generation plant or an external mechanical load. For example, the load 26 may include an electrical generator, a propeller of an airplane, and so forth. The air intake 24 draws air 30 into the gas turbine system 10 via a suitable mechanism, such as a cold air intake. The air 30 then flows through blades of the compressor 22, which provides compressed air 32 to the combustor 16. In particular, the fuel injector 12 may inject the compressed air 32 and fuel 14, as a fuel-air mixture 33, into the combustor 16. Alternatively, the compressed air 32 and fuel 14 may be injected directly into the combustor for mixing and combustion.

In the illustrated embodiment, the compressor 22 includes inlet guide vanes 34 rotatably coupled to a compressor inlet. The inlet guide vanes 34 are configured to control airflow into the compressor 22. For example, increasing an angle of the inlet guide vanes 34 reduces airflow into the compressor 22, and decreasing the angle of the inlet guide vanes 34 increases airflow into the compressor 22. Accordingly, adjusting the inlet guide vane angle may facilitate control of the fuel-air mixture within the combustor 16. In addition, the gas turbine engine includes an inlet bleed heat system 35 configured to adjust a temperature of the airflow into the compressor 22. The inlet bleed heat system 35 is configured to extract hot compressor discharge air from the compressor 22 and to reinject the compressor discharge air into the intake 24. Heat from the compressor discharge air increases a temperature of the airflow into the compressor 22, thereby reducing the air density. As a result, adjusting flow through the inlet bleed heat system 35 may facilitate control of the fuel-air mixture within the combustor 16.

As illustrated, the turbine system 10 includes an on-line optical monitoring system 36 optically coupled to the combustor 16. In the illustrated embodiment, the optical monitoring system 36 includes an optical connection 38 (e.g., a fiber optic cable, an optical waveguide, etc.) extending between a viewport 39 into the combustor 16 and an optical filter 40. As discussed in detail below, the optical filter 40 is configured to receive broad wavelength band thermal radiation from an interior surface of the combustor 16 (e.g., via the viewport 39 and the optical connection 38) while the gas turbine engine is in operation, to substantially block wavelengths of the broad wavelength band thermal radiation emitted and/or absorbed by a flame and/or by exhaust gas within the combustor 16, and to output narrow wavelength band thermal radiation from the interior surface of the combustor 16. A detector array 42, which is in optical communication with the optical filter 40, is configured to receive the narrow wavelength band thermal radiation and to output signals indicative of a two-dimensional intensity map of the narrow wavelength band thermal radiation. In the illustrated embodiment, the detector array 42 is communicatively coupled to a controller 44, which is configured to receive the signals and to generate a two-dimensional temperature map of the interior surface of the combustor based on the signals. Because the optical monitoring system 36 generates a two-dimensional temperature map, a temperature gradient across the monitored surface of the combustor may be measured, as compared to pyrometry systems that only measure a line-of-sight point temperature or an average temperature of the interior combustor surface. Analyzing the temperature gradient of the combustor surface may provide additional information related to surface stress, thereby facilitating determination of a maintenance interval.

As discussed in detail below, certain combustors 16 include a thermal barrier coating (TBC), which is applied to certain surfaces of the combustor 16 to substantially reduce heat flux from the flame and/or the hot exhaust gas to the surfaces. In addition, certain combustors 16 may include cooling holes within the combustor liner to facilitate airflow from the compressor 22 to the interior of the combustor, thereby cooling the liner. In certain embodiments, the controller is configured to detect TBC detachment/spallation and/or blocked/worn cooling holes based on the signals indicative of the two-dimensional intensity map and/or the two-dimensional temperature map. If TBC detachment/spallation and/or blocked/worn cooling holes are detected, the controller 44 may instruct a user interface 45 to output a signal (e.g., an audio signal, a visual signal, a graphical representation on a display, etc.) indicative of the detected condition. An operator and/or an automated system may then adjust operation of the gas turbine engine and/or determine a maintenance interval based on the signal.

In further embodiments, the controller 44 may be configured to automatically control a parameter affecting combustion within the combustor 16 based on the signals indicative of the two-dimensional intensity map of the narrow wavelength band thermal radiation. As previously discussed, the controller 44 may determine a temperature of the interior surface of the combustor 16 and/or a temperature gradient of the interior surface of the combustor 16. The controller 44 may also detect TBC detachment/spallation and/or blocked/worn cooling holes. Based on the interior surface temperature, the interior surface temperature gradient, detection of TBC detachment, detection of TBC spallation, detection of blocked cooling holes, and/or detection of worn cooling holes, the controller 44 may adjust a parameter affecting combustion, thereby enhancing operation of the gas turbine engine and/or increasing the maintenance interval. For example, in the illustrated embodiment, the controller 44 is communicatively coupled to the fuel injectors 12, to the inlet guide vanes 34, and to the inlet bleed heat system 35. Accordingly, the controller 44 may adjust fuel flow into the combustor 16, fuel distribution to multiple fuel nozzles, inlet guide vane angle, and/or inlet bleed heat based on the signals indicative of the two-dimensional intensity map of the narrow wavelength band thermal radiation.

By way of example, if the temperature of the interior surface of the combustor 16 exceeds a threshold value, the temperature gradient of the interior surface exceeds a threshold value, TBC detachment is detected, TBC spallation is detected, blocked cooling holes are detected, and/or worn cooling holes are detected, the controller 44 may adjust the fuel-air mixture away from the stoichiometric ratio, thereby cooling the combustor. For example, the controller 44 may instruct the fuel injectors 12 to reduce fuel flow into the combustor 16, instruct the inlet guide vanes 34 to increase airflow into the compressor 22, and/or instruct the inlet bleed heat system 35 to reduce a temperature of the airflow into the compressor 22 to establish a lean fuel-air mixture. Conversely, the controller 44 may instruct the fuel injectors 12 to increase fuel flow into the combustor 16, instruct the inlet guide vanes 34 to reduce airflow into the compressor 22, and/or instruct the inlet bleed heat system 35 to increase a temperature of the airflow into the compressor 22 to establish a rich fuel-air mixture. The lean or rich mixture may decrease the combustion temperature within the combustor 16, thereby increasing the longevity of certain combustor components and/or increasing the maintenance interval.

Furthermore, if the temperature of the interior surface of the combustor 16 is below a threshold value, the temperature gradient of the interior surface is below a threshold value, TBC detachment is not detected, TBC spallation is not detected, blocked cooling holes are not detected, and/or worn cooling holes are not detected, the controller 44 may adjust the fuel-air mixture toward the stoichiometric ratio, thereby enhancing engine performance. For example, if the fuel-air mixture is rich, the controller 44 may instruct the fuel injectors 12 to reduce fuel flow into the combustor 16, instruct the inlet guide vanes 34 to increase airflow into the compressor 22, and/or instruct the inlet bleed heat system 35 to reduce a temperature of the airflow into the compressor 22. Conversely, if the fuel-air mixture is lean, the controller 44 may instruct the fuel injectors 12 to increase fuel flow into the combustor 16, instruct the inlet guide vanes 34 to reduce airflow into the compressor 22, and/or instruct the inlet bleed heat system 35 to increase a temperature of the airflow into the compressor 22. Adjusting the fuel-air mixture toward the stoichiometric ratio may enhance the performance of the gas turbine engine.

In certain embodiments, the controller 44 is an electronic controller having electrical circuitry configured to process data from the detector array 42 and/or to control operation of the gas turbine engine. For example, the controller 44 may include processors, storage devices, and memory devices. The processor(s) may be used to execute software, such as temperature map processing software, gas turbine engine control software, and so forth. Moreover, the processor(s) may include one or more microprocessors, such as one or more "general-purpose" microprocessors, one or more special-purpose microprocessors, and/or application specific integrated circuits (ASICS), or some combination thereof. For example, the processor(s) may include one or more reduced instruction set (RISC) processors.

The storage device(s) (e.g., nonvolatile storage) may include read-only memory (ROM), flash memory, a hard drive, or any other suitable optical, magnetic, or solid-state storage medium, or a combination thereof. The storage device(s) may store data (e.g., thermal radiation intensity data, gas turbine engine control data, etc.), instructions (e.g., software or firmware for controlling the gas turbine engine, etc.), and any other suitable data. The memory device(s) may include a volatile memory, such as random access memory (RAM), and/or a nonvolatile memory, such as ROM. The memory device(s) may store a variety of information and may be used for various purposes. For example, the memory device(s) may store processor-executable instructions (e.g., firmware or software) for the processor(s) to execute, such as instructions for a temperature map processing software and/or a gas turbine engine control software.

In certain embodiments, the controller 44 may include a communication device (e.g., network interface, wireless communication module, etc.) configured to communicate (e.g., via wired or wireless signals) with a remote server or a cloud-based computer network, for example. In certain embodiments, the controller 44 may output signals indicative of the two-dimensional temperature map of the interior surface of the combustor. The remote server or network may store and/or process the signals to facilitate short-term and/or long-term health monitoring of the combustor. For example, the remote server or network may compare a first two-dimensional temperature map of an interior combustor surface with a previous two-dimensional temperature map of the surface to identify variations in the temperature and/or the temperature gradient.

In further embodiments, the controller 44 includes a first controller (e.g., an optical monitoring controller) configured to generate the two-dimensional temperature map of the interior surface of the combustor, and to detect TBC detachment/spallation and/or blocked/worn cooling holes. The controller 44 also includes a second controller (e.g., gas turbine operation controller) configured to control one or more parameters affecting combustion. In such embodiments, the first controller may output signals to the second controller indicative of the two-dimensional intensity map of the narrow wavelength band thermal radiation, the two-dimensional temperature map, detection of TBC detachment/spallation, and/or detection of blocked/worn cooling holes (e.g., via a communication device). The second controller, in turn, automatically controls the parameters affecting combustion based on the signals. As will be appreciated, the first and second controllers may be elements of a common control system and/or disposed within a common housing. Alternatively, the first and second controllers may be disposed within separate housings and/or positioned remote from one another within the gas turbine system.

Figure 2:
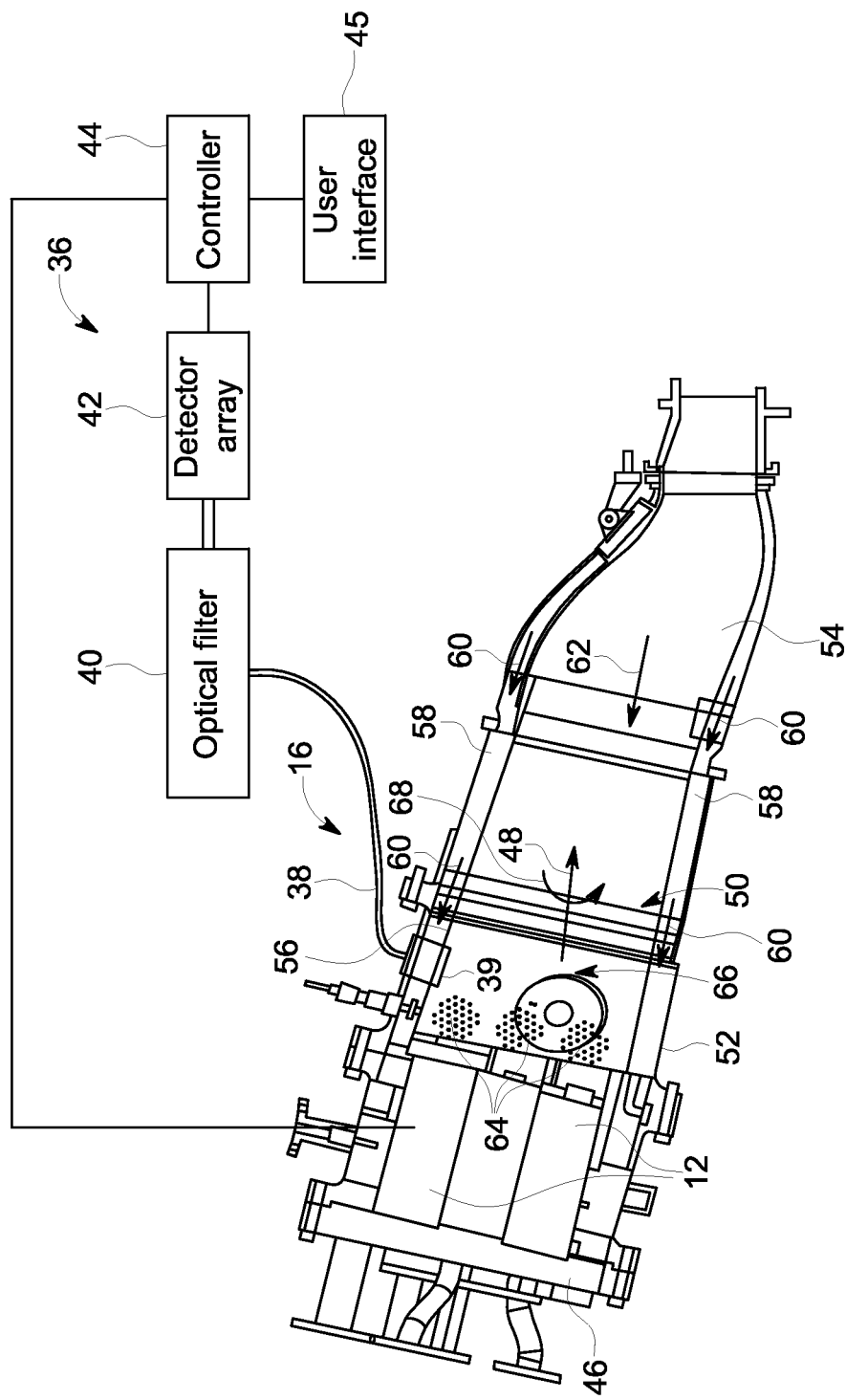
FIG. 2 is a cross-sectional view of an embodiment of a combustor, including various combustor components that may be monitored by an on-line optical monitoring system.

FIG. 2 is a cross-sectional view of an embodiment of a combustor 16, including various combustor components that may be monitored by the on-line optical monitoring system 36. As illustrated, the combustor 16 includes fuel nozzles 12 that are attached to an end cover 46 at a base of the combustor 16. In certain embodiments, the combustor 16 may include five or six fuel nozzles 12. In other embodiments, the combustor 16 may include a single large fuel nozzle 12. The surfaces and geometry of the fuel nozzles 12 are particularly configured to enhance mixing of the air and fuel as the fuel-air mixture flows downstream through the combustor 16. The enhanced mixing may increase combustor efficiency, thereby producing more power in the turbine engine. The fuel-air mixture is expelled from the fuel nozzles 12 in a downstream direction 48 to a combustion zone 50 inside a combustor casing 52. The combustion zone 50 is positioned downstream from the fuel nozzles 12 to reduce heat transfer from the hot combustion gas to the fuel nozzles 12.

In the illustrated embodiment, the combustion zone 50 is located inside the combustor casing 52, downstream from the fuel nozzles 12 and upstream from a transition piece 54, which directs the pressurized exhaust gas toward the turbine 18. The transition piece 54 includes a converging section configured to increase a velocity of the exhaust gas, thereby producing a greater force to drive the turbine 18 in rotation. In the illustrated embodiment, the combustor 16 includes a liner 56 located inside the casing 52 to provide a hollow annular path 58 for a cooling airflow 60, which cools the casing 52 around the combustion zone 50. As illustrated, the cooling airflow 60 flows in an upstream direction 62, opposite the downstream direction 48, through the hollow annular path 58 to the fuel nozzles 12. The airflow 60 then mixes with the fuel to establish a fuel-air mixture suitable for combustion. In certain embodiments, the liner 56 includes cooling holes configured to facilitate passage of the cooling airflow into an interior of the combustor, thereby cooling the liner 56 and/or providing additional air for combustion. Furthermore, the liner 56 may establish a suitable shape to improve flow from the fuel nozzles 12 to the turbine 18.

In the illustrated embodiment, the optical monitoring system 36 includes an optical connection 38 to a viewport 39 into the combustor 16. The viewport 39 is directed toward a region of interest within the combustor 16. For example, in the illustrated embodiment, the viewport 39 is directed toward the liner 56 on an opposite side of the combustor 16 from a flame 64 and exhaust gas 66. As discussed in detail below, the optical monitoring system 36 may include additional viewports 39 to facilitate monitoring of other interior surfaces of the combustor, such as an interior surface of the transition piece 54.

As previously discussed, the optical monitoring system 36 includes an optical filter 40 optically coupled to the viewport 39 and configured to receive broad wavelength band thermal radiation from the interior surface of the combustor 16 while the gas turbine engine is in operation. The optical filter 40 is also configured to substantially block wavelengths of the broad wavelength band thermal radiation emitted and/or absorbed by the flame 64 and/or by the exhaust gas 66 within the combustor 16, and to output narrow wavelength band thermal radiation from the interior surface of the combustor. In addition, the optical monitoring system 36 includes a detector array 42 in optical communication with the optical filter. The detector array 42 is configured to receive the narrow wavelength band thermal radiation and to output signals indicative of a two-dimensional intensity map of the narrow wavelength band thermal radiation to the controller 44. The controller 44, in turn, is configured to generate a two-dimensional temperature map of the interior surface of the combustor based on the signals. As discussed in detail below, the controller 44 is communicatively coupled to a user interface 45, which may include a display configured to present a graphical representation of the two-dimensional temperature map of the interior surface of the combustor. In addition, the controller 44 may be configured to detect TBC detachment, TBC spallation, blocked cooling holes, and/or worn cooling holes based on the signals. In such configurations, the controller 44 may instruct the user interface 45 to output a signal (e.g., an audio signal, a visual signal, a graphical representation on a display, etc.) indicative of the detected condition.

In certain embodiments, the controller 44 is configured to control a parameter affecting combustion within the combustor 16 based on the signals indicative of the two-dimensional intensity map of the narrow wavelength band thermal radiation. For example, the controller 44 may adjust a fuel flow rate to the combustor, fuel distribution to multiple fuel nozzles within the combustor, inlet guide vane angle, and/or inlet bleed heat, among other parameters. As previously discussed, the controller 44 may control the fuel nozzles 12, the inlet guide vanes 34, and/or the inlet bleed heat system 35 to adjust the fuel-air mixture within the combustor 16, thereby controlling the temperature of the flame 64 and/or the exhaust gas 66. In addition, the controller 44 may be configured to detect fuel maldistribution within the combustor 16 and to adjust fuel flow to each fuel nozzle to equalize the fuel distribution. As will be appreciated, fuel maldistribution may occur when fuel flow to certain fuel nozzles is greater than fuel flow to other fuel nozzles. In certain embodiments, the controller 44 is configured to adjust fuel flow to each nozzle individually. Accordingly, if the controller 44 detects that a temperature of a first surface proximate to a first fuel nozzle is greater than a temperature of a second surface proximate to a second fuel nozzle, the controller may reduce fuel flow to the first fuel nozzle and/or increase fuel flow to the second fuel nozzle, thereby establishing a substantially even fuel distribution within the combustor 16. The even fuel distribution may enhance the performance of the gas turbine engine and/or increase the maintenance interval.

While the illustrated embodiment includes a single viewport 39 into the combustor 16, it should be appreciated that alternative embodiments may include additional viewports. For example, in certain embodiments, the combustor 16 may include 2, 4, 6, 8, 10, 12, or more viewports 39. The viewports 39 may be distributed along the length of the combustor 16 in the direction 48 and/or about the circumference of the combustor 16 in the direction 68. Each viewport 39 may be directed toward a region of interest within the combustor 16. For example, viewports 39 located proximate to the fuel nozzles 12 may be directed toward surfaces (e.g., the liner 56, etc.) within the combustion zone 50 proximate to the flames 64, and the viewports 39 located farther downstream may be directed toward the combustor liner 56 and/or the transition piece 54. In this manner, various regions of the combustor 16 may be monitored by the optical monitoring system 36. In addition, by positioning viewports 39 circumferentially around the combustor 16 in the direction 68, the optical monitoring system 36 may monitor different portions of the combustor liner 56 and/or the transition piece 54. Furthermore, while the optical monitoring system 36 is configured to monitor a single combustor in the illustrated embodiment, it should be appreciated that, in alternative embodiments, the optical monitoring system 36 may be configured to monitor multiple combustors.

Figure 3:
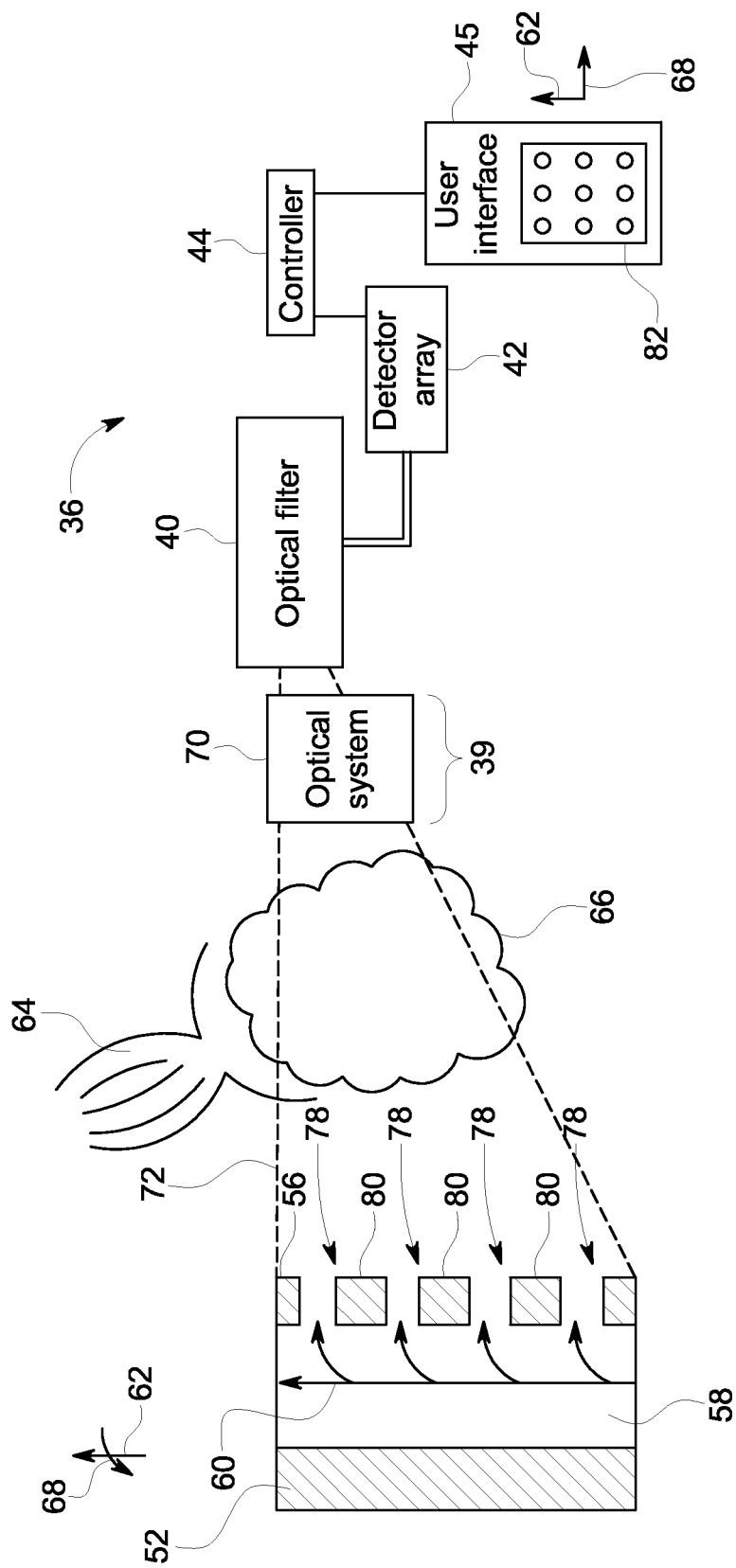
FIG. 3 is a schematic diagram of an embodiment of an on-line optical monitoring system directed toward an interior surface of a combustor.

FIG. 3 is a schematic diagram of an embodiment of an on-line optical monitoring system 36 directed toward an interior surface of a combustor 16. In the illustrated embodiment, the optical filter 40 is directed toward the combustor liner 56 proximate to the flames 64 and the exhaust gas 66. However, it should be appreciated that the optical filter may be directed toward other regions of the combustor (e.g., the transition piece 54, etc.) in alternative embodiments. As will be appreciated, broad wavelength band thermal radiation may be emitted from the liner 56, the flames 64, and the exhaust gas 66. The broad wavelength band thermal radiation is, in turn, received by the optical monitoring system 36 (e.g., as a combination of thermal radiation emitted by the combustor liner 56 and not absorbed by the flames and/or the exhaust gas 66, and thermal radiation emitted by the flames 64 and/or the exhaust gas 66). Such broad wavelength band thermal radiation may have wavelengths within the infrared, visible, and/or ultraviolet regions of the electromagnetic spectrum.

As illustrated, the viewport 39 is positioned between the optical filter 40 and the flame 64/exhaust gas 66. In the illustrated embodiment, an optical system 70 (e.g., optical tube, optical probe, etc.) is disposed within the viewport 39. The optical system 70 may include a lens configured to focus the radiation emitted by the combustor liner 56 and the flame 64/exhaust gas 66 onto the optical filter 40. As will be appreciated, the lens, or series of lenses, establishes a field of view 72 covering at least a portion of the combustor liner 56, or other desired surfaces of the combustor 16. The field of view 72 is also affected by the position of the optical filter relative to the monitored surface of the combustor 16 and/or the configuration of the optical connection 38, if present. By selecting an appropriate lens and/or properly positioning the optical filter, a desired field of view 72 may be established, thereby enabling the optical monitoring system 36 to capture broad wavelength band thermal radiation from the combustor surface. The optical system 70 may also include a window positioned between the lens and the flame 64/exhaust gas 66. The window may be formed from a heat resistant transparent material, such as fused quartz or synthetic sapphire, among others. As will be appreciated, the window material may be particularly selected to be substantially transparent to the monitored wavelengths (e.g., mid-wave infrared). While the illustrated embodiment includes an optical system 70, it should be appreciated that the optical system 70 may be omitted in alternative embodiments. Furthermore, while the illustrated embodiment does not include an optical connection, it should be appreciated that, in certain embodiments, an optical connection may be optically coupled to the optical system 70 and extend from the optical system 70 to the optical filter 40.

As previously discussed, the optical monitoring system 36 is configured to capture a two-dimensional intensity map of the narrow wavelength band thermal radiation from combustor liner 56. As will be appreciated, the combustor liner 56 emits thermal radiation over a wide wavelength range as the temperature of the combustor liner increases. In addition, certain combustion products species, such as water vapor and carbon dioxide, absorb and emit thermal radiation over a wide range of wavelengths in response to increased temperature. As a result, during operation of the gas turbine engine 10, only a fraction of wavelengths of the thermal radiation emitted by the combustor liner 56 reach the optical monitoring system 36 with sufficient intensity and negligible interference for accurate intensity measurement. Consequently, the optical monitoring system 36 is configured to measure the intensity of thermal radiation within a wavelength range that is more likely to pass through the flame 64/exhaust gas 66 without significant absorption or interference, thereby enabling the system to determine the temperature of the combustor liner 56. For example, wavelengths of thermal radiation within the mid-wave infrared spectrum may pass through the flame 64/exhaust gas 66 with less absorption than other wavelength ranges. Therefore, the optical monitoring system 36 may utilize such a wavelength range for determining the temperature of the combustor liner 56, and/or for monitoring the TBC and/or the cooling holes. For example, the optical monitoring system 36 may be configured to measure the intensity of wavelengths within a range of about 1 to about 5 microns, within a range of about 3 to about 5 microns, within a range of about 3.5 to about 4.0 microns, or within a range of about 3.8 to about 4.0 microns to monitor the combustor liner 56. However, because exhaust gas species may vary, alternative embodiments may measure an intensity of thermal radiation within other portions of the visible, infrared, and/or ultraviolet spectra.

In the illustrated embodiment, the optical filter 40 is configured to receive broad wavelength band thermal radiation from the combustor liner 56, to substantially block wavelengths of the broad wavelength band thermal radiation emitted and/or absorbed by the flame 64 and/or by the exhaust gas 66, and to output narrow wavelength band thermal radiation from the combustor liner 56. The optical filter 40 may include any suitable mechanism for blocking wavelengths of thermal radiation emitted and/or absorbed by the flame 64 and/or the by exhaust gas 66. For example, the optical filter 40 may include a reflectance-type filter, such as one or more dichroic mirrors, configured to receive broad wavelength band thermal radiation from the combustor liner 56 and to output narrow wavelength band thermal radiation from the combustor liner 56. As will be appreciated, dichroic mirrors include a reflective surface configured to reflect radiation of a desired wavelength range, while enabling the remaining radiation to pass through. In certain embodiments, a dichroic mirror may be configured to reflect radiation having wavelengths indicative of a temperature of the combustor liner and to facilitate transmission of radiation having wavelengths emitted and/or absorbed by the flame 64 and/or by the exhaust gas 66. Conversely, in alternative embodiments, a dichroic mirror may be configured to reflect radiation having wavelengths emitted and/or absorbed by the flame 64 and/or by the exhaust gas 66 and to facilitate transmission of thermal radiation having wavelengths indicative of a temperature of the combustor liner. As will be appreciated, the detector array 42 may be particularly positioned to receive the radiation having wavelengths indicative of a temperature of the combustor liner. In addition, it should be appreciated that the range of wavelengths reflected by the dichroic mirror may be particularly selected based on the coating applied to the mirror.

In further embodiments, the optical filter 40 may include a transmittance-type filter, such as an absorptive filter. As will be appreciated, absorptive filters include a substantially transparent substrate (e.g., glass or plastic) to which various compounds are added to facilitate absorption of thermal radiation having a desired wavelength range. For example, the optical filter 40 may include an absorptive filter configured to substantially block wavelengths of the broad wavelength band thermal radiation emitted and/or absorbed by the flame 64 and/or by the exhaust gas 66, while facilitating transmission of thermal radiation within a desired narrow wavelength band (e.g., wavelengths indicative of a temperature of the combustor liner 56). In certain embodiments, multiple absorptive filters may be utilized to block the desired wavelengths of thermal radiation. In further embodiments, the optical filter 40 may include one or more absorptive filters and one or more dichroic mirrors to facilitate output of the narrow wavelength band thermal radiation, while substantially blocking wavelengths of thermal radiation emitted and/or absorbed by the flame 64 and/or by the exhaust gas 66.

By way of example, the optical filter 40 may be a band-pass filter configured to facilitate passage of thermal radiation having wavelengths within a range of about 1 to about 5 microns, within a range of about 3 to about 5 microns, within a range of about 3.5 to about 4.0 microns, or within a range of about 3.8 to about 4.0 microns. The range of wavelengths may be defined in terms of half-power points, which represent wavelengths corresponding to 3 dB of attenuation of the thermal radiation. For example, if the optical filter 40 is configured to facilitate passage of thermal radiation having wavelengths within a range of about 3.8 to about 4.0 microns, thermal radiation having wavelengths between about 3.8 microns to about 4.0 microns is attenuated by less than 50 percent, and thermal radiation having wavelengths less than about 3.8 microns and greater than about 4.0 microns are attenuated by greater than 50 percent. While a band-pass filter is described above, it should be appreciated that a low-pass filter, a high-pass filter, or a combination of low-pass, high-pass, and/or band-pass filters may be employed in certain embodiments.

As previously discussed, the combustor liner 56 includes cooling holes 78 configured to facilitate passage of the cooling airflow 60 from the annular passage 58 to an interior of the combustor 16. If one of the cooling holes becomes blocked or worn, the temperature of the liner 56 surrounding the blocked or worn cooling hole may increase. As discussed in detail below, the controller 44 may be configured to detect the local increase in liner temperature, thereby facilitating detection of a blocked or worn cooling hole. Furthermore, in the illustrated embodiment, TBC 80 is applied to the combustor liner 56 to substantially reduce heat flux from the flame 64 and/or from the hot exhaust gas 66 to the combustor liner. The TBC may include ceramic tiles secured to the combustor liner and/or a ceramic coating sprayed onto the liner. For example, the sprayed coating may be composed of yttria-stabilized zirconia (YSZ). If the sprayed coating or ceramic tiles detach, gaps form in the TBC, or portions of the TBC spall, the liner temperature may vary at the site of the detachment/spallation. The controller 44 may be configured to detect the local increase in liner temperature, thereby facilitating detection of TBC detachment or spallation. While detecting TBC detachment/spallation and blocked/worn cooling holes are described herein, it should be appreciated that the controller may be configured to detect other conditions within the combustor, such as cracks in the liner, accumulation of debris on the liner, and/or surface deterioration in the transition piece, among other conditions.

In the illustrated embodiment, the optical filter 40 outputs the narrow wavelength band thermal radiation from combustor liner 56 to the detector array 42. The detector array 42, in turn, is configured to output signals to the controller 44 indicative of a two-dimensional intensity map of the narrow wavelength band thermal radiation. As previously discussed, the controller 44 is configured to generate a two-dimensional temperature map of the interior surface of the combustor 16 based on the signals from the detector array 42. For example, a temperature of the surface may be determined by measuring the intensity of thermal radiation emitted by the surface at a particular wavelength. For example, assuming emissivity is one (Black Body assumption), Planck's Law may be utilized to compute temperature from a measured radiation intensity. However, because actual components may have an emissivity less than one, the controller 44 may utilize an emissivity value based on experimental observation and/or computation. For example, the controller 44 may utilize a constant emissivity value or an emissivity value that varies based on temperature, operational history of the gas turbine engine, and/or other parameters. By computing the temperature at each point within the two-dimensional intensity map of the narrow wavelength band thermal radiation, the controller 44 may generate a two-dimensional temperature map 82 of the combustor liner 52, which may be presented to an operator via the user interface 45.

As previously discussed, a local increase in temperature of the combustor liner 56 may be indicative of a blocked/worn cooling hole and/or TBC detachment/spallation. Accordingly, in certain embodiments, the controller 44 is configured to detect a blocked cooling hole, worn cooling holes, TBC detachment, and/or TBC spallation based on the two-dimensional temperature map 82. In further embodiments, the controller 44 may detect a blocked cooling hole by identifying an obstruction within the hole, the controller 44 may detect a worn cooling hole by monitoring the shape of the hole, and the controller 44 may detect TBC detachment or spallation by identifying an anomaly (e.g., a gap in the coating, a missing tile, etc.) in the TBC. Upon detection of a blocked/worn cooling hole and/or TBC detachment/spallation, the controller 44 may determine a maintenance interval for the combustor, and output a signal to the user interface 45 indicative of the detected condition and/or the maintenance interval.

In certain embodiments, the controller 44 is configured to automatically control a parameter affecting combustion within the combustor 16 based on the signals indicative of the two-dimensional intensity map of the narrow wavelength band thermal radiation. As previously discussed, the controller 44 may determine a temperature of the interior surface of the combustor 16 and/or a temperature gradient of the interior surface of the combustor 16. The controller 44 may also detect TBC detachment/spallation and/or blocked/worn cooling holes. Based on the interior surface temperature, the interior surface temperature gradient, detection of TBC detachment, detection of TBC spallation, detection of blocked cooling holes, and/or detection of worn cooling holes, the controller 44 may adjust a parameter affecting combustion, thereby enhancing operation of the gas turbine engine and/or increasing the maintenance interval. For example, the controller 44 may adjust fuel flow into the combustor 16, fuel distribution to multiple fuel nozzles, inlet guide vane angle, and/or inlet bleed heat based on the signals indicative of the two-dimensional intensity map of the narrow wavelength band thermal radiation.

Figure 4:
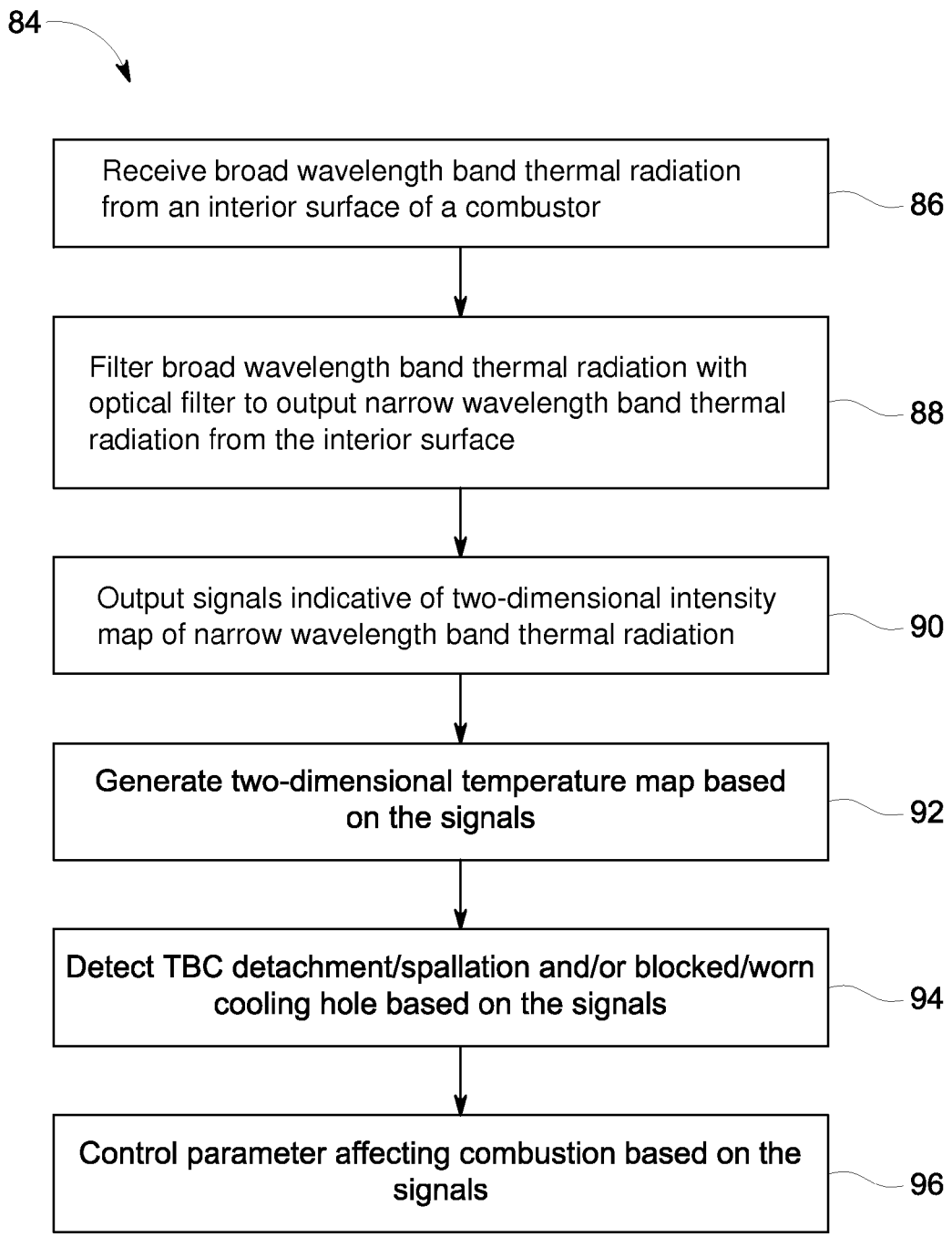
FIG. 4 is a flow diagram of an embodiment of a method for on-line optical monitoring and control of a gas turbine engine.

FIG. 4 is a flow diagram of an embodiment of a method 84 for on-line optical monitoring and control of a gas turbine engine. First, as represented by block 86, broad wavelength band thermal radiation from an interior surface of a combustor of the gas turbine engine is received while the gas turbine engine is in operation. For example, the broad wavelength band thermal radiation may be conveyed from a viewport into the combustor to an optical filter by an optical connection. Next, the broad wavelength band thermal radiation is filtered by the optical filter to output narrow wavelength band thermal radiation from the interior surface, as represented by block 88. As previously discussed, the optical filter may include a reflectance-type filter and/or a transmittance-type filter configured to substantially block wavelengths of the broad wavelength band thermal radiation emitted and/or absorbed by a flame and/or by exhaust gas within the combustor. Signals indicative of a two-dimensional intensity map of the narrow wavelength band thermal radiation are then output by a detector array, as represented by block 90. In certain embodiments, a two-dimensional temperature map of the interior surface of the combustor is generated based on the signals, as represented by block 92. Accordingly, a temperature gradient across the monitored surface of the combustor may be measured, thereby providing additional information related to surface stress, which may facilitate determination of a maintenance interval.

In certain embodiments, TBC detachment/spallation and/or a blocked/worn cooling hole is detected, as represented by block 94. As previously discussed, a controller may identify TBC detachment/spallation and/or a blocked/worn cooling hole based on a local variation in temperature of the combustor liner. Detecting such conditions may facilitate determination of a maintenance interval, thereby enhancing engine operations. Furthermore, in certain embodiments, a parameter affecting combustion within the combustor is controlled based on the signals, as represented by block 96. For example, the parameter affecting combustion may include fuel flow rate to the combustor, fuel distribution to multiple fuel nozzles within the combustor, inlet guide vane angle, and/or inlet bleed heat, among others. By way of example, a temperature of the interior surface of the combustor and/or a temperature gradient of the interior surface of the combustor may be determined, and/or TBC detachment/spallation and/or blocked/worn cooling holes may be detected. Based on the interior surface temperature, the interior surface temperature gradient, detection of TBC detachment, detection of TBC spallation, detection of blocked cooling holes, and/or detection of worn cooling holes, a parameter affecting combustion may be adjusted, thereby enhancing operation of the gas turbine engine and/or increasing the maintenance interval. For example, fuel flow rate into the combustor, fuel distribution to multiple fuel nozzles, inlet guide vane angle, and/or inlet bleed heat may be adjusted based on the signals indicative of the two-dimensional intensity map of the narrow wavelength band thermal radiation.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system for on-line optical monitoring of a gas turbine engine, comprising:
   a viewport into a combustor of the gas turbine engine;
   an optical filter optically coupled to the viewport, wherein the optical filter is configured to receive broad wavelength band thermal radiation from an interior surface of the combustor while the gas turbine engine is in operation, to substantially block wavelengths of the broad wavelength band thermal radiation emitted, absorbed, or a combination thereof, by a flame, by exhaust gas, or a combination thereof, within the combustor, and to output narrow wavelength band thermal radiation from the interior surface of the combustor; and
   a detector array in optical communication with the optical filter, wherein the detector array is configured to receive the narrow wavelength band thermal radiation and to output signals indicative of a two-dimensional intensity map of the narrow wavelength band thermal radiation.

2. The system of claim 1, comprising a controller communicatively coupled to the detector array, wherein the controller is configured to generate a two-dimensional temperature map of the interior surface of the combustor based on the signals.

3. The system of claim 1, wherein the interior surface of the combustor comprises a thermal barrier coating (TBC), a plurality of cooling holes, or a combination thereof.

4. The system of claim 3, comprising a controller communicatively coupled to the detector array, wherein the controller is configured to detect at least one of TBC detachment, TBC spallation, a blocked cooling hole of the plurality of cooling holes, and a worn cooling hole of the plurality of cooling holes, based on the signals.

5. The system of claim 1, wherein the combustor comprises a transition piece configured to convey hot exhaust gas from a combustion zone to a turbine, and the transition piece includes the interior surface.

6. The system of claim 1, comprising an optical connection configured to convey the image from the viewport to the optical filter.

7. The system of claim 1, wherein the optical filter is configured to substantially block wavelengths of the broad wavelength band thermal radiation below about 1 micron and above about 5 microns.

8. The system of claim 7, wherein the optical filter is configured to substantially block wavelengths of the broad wavelength band thermal radiation below about 3.8 microns and above about 4.0 microns.

9. A system for on-line optical monitoring and control of a gas turbine engine, comprising:
   a viewport into a combustor of the gas turbine engine;
   an optical filter optically coupled to the viewport, wherein the optical filter is configured to receive broad wavelength band thermal radiation from an interior surface of the combustor while the gas turbine engine is in operation, to substantially block wavelengths of the broad wavelength band thermal radiation emitted, absorbed, or a combination thereof, by a flame, by exhaust gas, or a combination thereof, within the combustor, and to output narrow wavelength band thermal radiation from the interior surface of the combustor;
   a detector array in optical communication with the optical filter, wherein the detector array is configured to receive the narrow wavelength band thermal radiation and to output signals indicative of a two-dimensional intensity map of the narrow wavelength band thermal radiation; and
   a controller communicatively coupled to the detector array, wherein the controller is configured to control a parameter affecting combustion in the combustor based on the signals.

10. The system of claim 9, wherein the parameter affecting combustion comprises fuel flow rate to the combustor, fuel distribution to a plurality of fuel nozzles within the combustor, inlet guide vane angle, inlet bleed heat, or a combination thereof.

11. The system of claim 9, wherein the controller is configured to generate a two-dimensional temperature map of the interior surface of the combustor based on the signals.

12. The system of claim 9, wherein the interior surface of the combustor comprises a thermal barrier coating (TBC), a plurality of cooling holes, or a combination thereof, and the controller is configured to detect at least one of TBC detachment, TBC spallation, a blocked cooling hole of the plurality of cooling holes, and a worn cooling hole of the plurality of cooling holes, based on the signals.

13. The system of claim 9, comprising an optical connection configured to convey the broad wavelength band thermal radiation from the viewport to the optical filter.

14. The system of claim 9, wherein the optical filter is configured to substantially block wavelengths of the broad wavelength band thermal radiation below about 3 microns and above about 5 microns.

15. The system of claim 14, wherein the optical filter is configured to substantially block wavelengths of the broad wavelength band thermal radiation below about 3.8 microns and above about 4.0 microns.

16. A method for on-line optical monitoring of a gas turbine engine, comprising:
receiving broad wavelength band thermal radiation from an interior surface of a combustor of the gas turbine engine while the gas turbine engine is in operation;
filtering the broad wavelength band thermal radiation with an optical filter to substantially block wavelengths of the broad wavelength band thermal radiation emitted, absorbed, or a combination thereof, by a flame, by exhaust gas, or a combination thereof, within the combustor, and to output narrow wavelength band thermal radiation from the interior surface of the combustor; and
outputting signals indicative of a two-dimensional intensity map of the narrow wavelength band thermal radiation via a detector array in optical communication with the optical filter.

17. The method of claim 16, comprising controlling a parameter affecting combustion in the combustor based on the signals.

18. The method of claim 17, wherein the parameter affecting combustion comprises fuel flow rate to the combustor, fuel distribution to a plurality of fuel nozzles within the combustor, inlet guide vane angle, inlet bleed heat, or a combination thereof.

19. The method of claim 16, comprising generating a two-dimensional temperature map of the interior surface of the combustor based on the signals.

20. The method of claim 16, comprising detecting thermal barrier coating (TBC) detachment or spallation within the combustor, detecting a blocked or worn cooling hole within the combustor, or a combination thereof, based on the signals.

* * * * *